United States Patent
Yu et al.

(10) Patent No.: US 10,150,867 B2
(45) Date of Patent: Dec. 11, 2018

(54) IN-SITU COMPATIBILIZATION OF SILICONE RUBBER/POLYOLEFIN ELASTOMER BLENDS BY FORMING IONOMERS FOR COLD SHRINK SPLICE AND PREPARATION METHOD THEREOF

(71) Applicants: Dow Global Technologies LLC, Midland, MI (US); Haiyang Yu, Shanghai (CN); Yanli Huo, Croylaan (BE)

(72) Inventors: Haiyang Yu, Shanghai (CN); Yanli Huo, Croylaan (BE); Mohamed Esseghir, Lawrenceville, NJ (US); Saurav Sengupta, Collegeville, PA (US); Jeffrey Cogen, Flemington, NJ (US)

(73) Assignee: Dow Global Technologies LLC, Midland, MI (US)

( * ) Notice: Subject to any disclaimer, the term of this patent is extended or adjusted under 35 U.S.C. 154(b) by 35 days.

(21) Appl. No.: 15/322,293

(22) PCT Filed: Jun. 27, 2014

(86) PCT No.: PCT/CN2014/080969
§ 371 (c)(1),
(2) Date: Dec. 27, 2016

(87) PCT Pub. No.: WO2015/196458
PCT Pub. Date: Dec. 30, 2015

(65) Prior Publication Data
US 2017/0137624 A1    May 18, 2017

(51) Int. Cl.
| | |
|---|---|
| *C08L 83/04* | (2006.01) |
| *H02G 15/18* | (2006.01) |
| *C08K 3/22* | (2006.01) |
| *C08K 5/09* | (2006.01) |
| *C08L 23/16* | (2006.01) |
| *H01B 3/44* | (2006.01) |
| *C08G 77/20* | (2006.01) |

(52) U.S. Cl.
CPC ............. *C08L 83/04* (2013.01); *C08K 3/22* (2013.01); *C08K 5/09* (2013.01); *C08L 23/16* (2013.01); *H01B 3/441* (2013.01); *H02G 15/18* (2013.01); *C08G 77/20* (2013.01); *C08L 2203/202* (2013.01)

(58) Field of Classification Search
CPC .................... C08L 83/04; C08L 23/16
See application file for complete search history.

(56) References Cited

U.S. PATENT DOCUMENTS

| | | | |
|---|---|---|---|
| 5,246,783 A | 9/1993 | Spenadel et al. | |
| 5,733,977 A * | 3/1998 | Takemura | A63B 37/0003 473/372 |
| 6,448,343 B1 | 9/2002 | Schombourg et al. | |
| 6,496,629 B2 | 12/2002 | Ma et al. | |
| 6,714,707 B2 | 3/2004 | Rossi et al. | |
| 6,761,976 B2 | 7/2004 | Cottevieille et al. | |
| 7,141,183 B2 | 11/2006 | Hattori et al. | |
| 7,238,746 B2 | 7/2007 | Kataoka et al. | |
| 8,716,407 B2 | 5/2014 | Obrecht et al. | |
| 2005/0214491 A1 | 9/2005 | Vora | |
| 2006/0235156 A1 | 10/2006 | Griswold et al. | |
| 2006/0237878 A1 | 10/2006 | Vora | |
| 2007/0066730 A1 | 3/2007 | Chorvath et al. | |
| 2007/0135579 A1 | 6/2007 | Obrecht | |
| 2008/0039576 A1 | 2/2008 | Griswold et al. | |
| 2010/0222479 A1 | 9/2010 | Hona et al. | |
| 2012/0295047 A1 | 11/2012 | Obrecht et al. | |
| 2014/0205782 A1 | 7/2014 | Obrecht et al. | |

FOREIGN PATENT DOCUMENTS

| | | |
|---|---|---|
| CN | 101222129 A | 7/2008 |
| CN | 101544834 A | 9/2009 |
| CN | 103756328 A | 4/2014 |
| WO | 2006/007268 A1 | 1/2006 |

* cited by examiner

*Primary Examiner* — Kuo Liang Peng
(74) *Attorney, Agent, or Firm* — Husch Blackwell LLP

(57) ABSTRACT

A cold shrink article made from a composition comprising (A) a silicone rubber; (B) an ethylene/α-olefin interpolymer; (C) a filler; and (D) an α,β-unsaturated carboxylic acid. The composition may optionally include additives selected from the group consisting of plasticizer, peroxide curing agent, antioxidant, process additives, flame retardant and combinations thereof.

15 Claims, No Drawings

IN-SITU COMPATIBILIZATION OF SILICONE RUBBER/POLYOLEFIN ELASTOMER BLENDS BY FORMING IONOMERS FOR COLD SHRINK SPLICE AND PREPARATION METHOD THEREOF

FIELD OF THE INVENTION

This invention relates to wire and cable accessories, such as splices and terminations.

BACKGROUND OF THE INVENTION

Cold shrink (CS) splices are used to achieve a tight fit around cables and bundle cables together for protection against environmental factors. A conventional CS product typically comprises a flexible tube of an elastomer, which is held in expanded condition on a support core designed for removal from inside the flexible tube. During installation, the supporting core collapses on demand to allow the tube to shrink into contact with a wire or cable that needs protecting. Therefore, compared to the traditional heat shrink and pre-molded technology, the cold shrink splices have several advantages such as ease and repeatability of installation (no heat, no tools required) and broader cable size accommodation (reduced part inventory).

Since a sufficient shrink/retract from the expanded condition to original condition is needed, there is a high requirement on the tensile recovery performance, i.e., a low tensile permanent set is required.

Current cold shrink products in the market are made of silicon rubber such as high temperature vulcanization (HTV) and liquid silicone rubber (LSR), which have excellent tensile recovery performance due to their low inter-molecular interaction and less molecular entanglement. However, there are also several drawbacks for such silicon-rubber based CS products such as low tear resistance and low alternating current break down (ACBD) strength. The CS products may be damaged during demolding and expanding process if the tear resistance is not sufficient. In addition, end-users have reported tear failure during installation or usage. It is believed that since the part remains stretched during its service life, a low tear strength results in rapid crack propagation if initiated by a sharp object during installation or pinched form the surrounding environment during its service life. Also the high ACBD strength is a key requirement in the cable accessories application for connection longevity.

Blends of silicone rubber with a polyolefin (PO) elastomer show improved tear resistance and dielectric strength; however, the poor compatibility between PO elastomers and silicone rubber makes it difficult to attain such blends and increases costs. For example, current approaches for improving the compatibility between PO elastomers and silicone rubber focus on adding silane- or maleic anhydride (MAH) grafted PO elastomers to the PO/silicone rubber blends. Crating the functionalized polymers increases cost and production time. Furthermore, it is very difficult to graft MAH onto an unsaturated PO elastomer, such as ethylene/propylene/diene modified (EPDM) elastomers due to cross-linking side reactions.

There is a need for improved cold shrink materials having excellent tensile recovery performance as well as low tear resistance and low ACBD strength.

SUMMARY OF THE INVENTION

In one embodiment the invention is a composition comprising
(A) a silicone rubber;
(B) an ethylene/α-olefin interpolymer;
(C) a filler; and
(D) an α,β-unsaturated carboxylic acid.

The composition may optionally include additives selected from the group consisting of plasticizer, peroxide curing agent, antioxidant, process additives, flame retardant and combinations thereof.

In one embodiment the invention is a cold shrink article made from a composition comprising:
(A) a silicone rubber;
(B) an ethylene/α-olefin interpolymer;
(C) a filler; and
(D) an α,β-unsaturated carboxylic acid.

The composition may optionally include additives selected from the group consisting of plasticizer, peroxide curing agent, antioxidant, process additives, flame retardant and combinations thereof.

In one embodiment the invention is a cold shrink article comprising a shaped, stretched and cured composition comprising (A) a silicone rubber; (B) an ethylene/α-olefin interpolymer; (C) a filler; (D) an α,β-unsaturated carboxylic acid; and, optionally, one or more additives.

In an embodiment the invention is a cable comprising a cold shrink splice, the splice comprising a shaped, cured and shrunk composition, the composition comprising (A) a silicone rubber; (B) an ethylene/α-olefin interpolymer; (C) a filler; (D) an α,β-unsaturated carboxylic acid; and, optionally, one or more additives.

DETAILED DESCRIPTION OF THE PREFERRED EMBODIMENT

Definitions

All references to the Periodic Table of the Elements refer to the Periodic Table of the Elements published and copyrighted by CRC Press, Inc., 1990. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the density and melt index of components of the compositions of this invention.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

The term "or", unless stated otherwise, refers to the listed members individually as well as in any combination.

"Composition", "formulation" and like terms means a mixture or blend of two or more components.

"Crosslinked", "cured" and similar terms mean that the polymer, before or after it is shaped into an article, was subjected or exposed to a treatment which induced crosslinking and has xylene or decalene extractables between 10 and 100 weight percent (i.e., a gel content of 0-90%).

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. The terms "ethylene/alpha.-olefin polymer" and "propylene/alpha.-olefin polymer" are indicative of interpolymers as described below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

An "elastomer" is a rubber-like polymer which can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

"Ethylene-based polymer" and like terms mean a polymer that comprises a majority weight percent polymerized ethylene monomer (based on the total weight of polymerizable monomers), and optionally may comprise at least one polymerized comonomer.

"Ethylene-α-olefin elastomer" and like terms mean an elastomeric polymer comprising at least 50 mol % units derived from ethylene and between greater than zero and 50 mol % of units derived from an α-olefin, e.g., propylene, butene, hexene, octene, etc. "Derived from" means, in the context of this definition, that the units in the polymer backbone and/or polymer branches are a result of the polymerization or copolymerization of the monomers from which the polymer is made.

"Ethylene-propylene-diene polymer" and "EPDM" mean an unsaturated interpolymer chain composed of units derived from ethylene, propylene and a diene.

"Units derived from ethylene" and like terms mean the units of a polymer that formed from the polymerization of ethylene monomers.

"Units derived from α-olefin" and like terms mean the units of a polymer that formed from the polymerization of α-olefin monomers.

"Silicone rubber" means a crosslinking polyorganosiloxane material. A silicone rubber may be a peroxidically crosslinking or an addition-crosslinking silicone rubber.

"Cable," "power cable," and like terms means at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc., can be designed for low, medium and high voltage applications. Typical cable designs are illustrated in U.S. Pat. Nos. 5,246,783, 6,496,629 and 6,714,707.

"Cold shrink" and like terms refer to an open ended sleeve, made primarily from elastomers with high-performance physical properties, that has been factor expanded, or pre-stretched, and assembled onto a supporting removable plastic core. Cold shrink tubing shrinks upon removal of that supporting core during the installation process. In one embodiment, an electrician slide the tube over a cable to be spliced or terminated and unwinds the core, causing the tube to collapse down, or contract, in place.

Silicone Rubber

The silicone rubber, or silicone elastomers, useful in the practice of this invention are polyorganosiloxanes, and preferably peroxidically crosslinking polyorganosiloxanes. Typically the silicone rubbers useful in the practice of this invention have an average unit formula $R_aSiO_{(4-a)/2}$ which may have a linear or partially-branched structure but is preferably linear, wherein a is 0-3 and has an average numberical value of from 1.9 to 2.1 and each R may be the same or different. R is a substituted or non-substituted monovalent hydrocarbon group which may be, for example, an alkyl group, such as a methyl, ethyl, propyl, butyl, and octyl groups; aryl groups such as phenyl and tolyl groups; aralkyl groups; alkenyl groups, for example, vinyl, allyl, butenyl, hexenyl, and heptenyl groups; and halogenated alkyl groups, for example chloropropyl and 3,3,3-trifluoropropyl groups. The polyorganosiloxane may be terminated by any of the above groups or with hydroxyl groups. When R is an alkenyl group the alkenyl group is preferably a vinyl group or hexenyl group, and most preferably a vinyl group. Indeed alkenyl groups may be present in the polyorganosiloxane on terminal groups and/or polymer side chains.

Representative silicone rubbers or polyorganosiloxanes include, but are not limited to, dimethylvinylsiloxy-terminated polydimethylsiloxane, trimethylsiloxy-terminated polydimethylsiloxane, trimethylsiloxy-terminated copolymer of methylvinylsiloxane and dimethylsiloxane, dimethylvinylsiloxy-terminated copolymer of methylvinylsiloxane and dimethylsiloxane, dimethylhydroxysiloxy-terminated polydimethylsiloxane, dimethylhydroxysiloxy-terminated copolymer of methylvinylsiloxane and dimethylsiloxane, methylvinylhydroxysiloxy-terminated copolymer of methylvinylsiloxane and dimethylsiloxane, dimethylhexenylsiloxy-terminated polydimethylsiloxane, trimethylsiloxy-terminated copolymer of methylhexenylsiloxane and dimethylsiloxane, dimethylhexenylsiloxy-terminated copolymer of methylhexenylsiloxane and dimethylsiloxane, dimethylvinylsiloxy-terminated copolymer of methylphenylsiloxane and dimethylsiloxane, dimethylhexenylsiloxy-terminated copolymer of methylphenylsiloxane and dimethylsiloxane, dimethylvinylsiloxy-terminated copolymer of methyl(3,3,3-trifluoropropyl)siloxane and dimethylsiloxane, and dimethylhexenylsiloxy-terminated copolymer of methyl(3,3,3-trifluoropropyl)siloxane and dimethylsiloxane.

Most preferably, the silicone rubber is a vinyl-terminated silicone rubber, such as Silastic GP-30 from Dow Corning and silicone rubber 110 series available from DongJue Silicone Group China.

Ethylene-α-olefin Interpolymer

The ethylene-based polymers used in the practice of this invention comprise at least one ethylene/alpha-olefin interpolymer, which optionally may contain a diene. Such interpolymers include polymers polymerized from at least two different monomers. They include, for example, copolymers, terpolymers and tetrapolymers. Interpolymers particularly include polymers prepared by polymerizing ethylene with at least one comonomer, typically an alpha-olefin (α-olefin) of 3 to 20 carbon atoms ($C_3$-$C_{20}$), preferably 4 to 20 carbon atoms ($C_4$-$C_{20}$), more preferably 4 to 12 carbon atoms ($C_4$-$C_{12}$) and even more preferably 4 to 8 carbon atoms ($C_4$-$C_8$). The alpha-olefins include, but are not limited to, 1-butene, 1-pentene, 1-hexene, 4-methyl-1-pentene, 1-heptene, and 1-octene. Preferred alpha-olefins include 1-butene, 1-pentene, 1-hexene, 4-methyl-1-pentene, 1-heptene, and 1-octene. The alpha-olefin is desirably a $C_4$-$C_8$ alpha-olefin.

The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyethylene copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

The ethylene/alpha-olefin interpolymers of the invention may be branched and/or unbranched interpolymers. The presence or absence of branching in the ethylene/alpha-olefin interpolymers, and if branching is present, the amount of branching, can vary widely, and may depend on the desired processing conditions and the desired polymer properties.

Interpolymers include ethylene/butene (EB) copolymers, ethylene/hexene (EH), ethylene/octene (EO) copolymers, ethylene/alpha-olefin/diene modified (EAODM) interpolymers such as ethylene/propylene/diene modified (EPDM) interpolymers and ethylene/propylene/octene terpolymers. Preferred interpolymers include EPDM interpolymers.

EPDM interpolymer include units derived from a diene. The diene can be conjugated-, non-conjugated-, straight chain-, branched chain- or cyclic-hydrocarbon diene having from 6 to 15 carbon atoms. Nonlimiting examples of suitable diene include 1,4-hexadiene; 1,6-octadiene; 1,7-octadiene; 1,9-decadiene; branched chain acyclic diene, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, norbornadiene, 1,4-hexadiene (HD), 5-ethylidene-2-norbornene (ENB), 5-vinylidene-2-norbornene (VNB), 5-methylene-2-norbornene (MNB), and dicyclopentadiene (DCPD). In one embodiment the diene is selected from VNB and ENB. In one embodiment the diene is butadiene.

Generally, the greater the α-olefin content of the interpolymer, the lower the crystallinity. In one embodiment, the ethylene/α-olefin interpolymers useful in the present invention are amorphous and have a crystallinity, as measured by differential scanning calorimetry (DSC), of less than or equal to 10%, or preferably less than or equal to 5%, or less than or equal to 2%.

In an embodiment, the ethylene/α-olefin interpolymers suitable for use in the present invention have a melt index (MI or $I_2$) of less than about 100 g/10 min, preferably less than about 75 g/10 min, more preferably less than about 50 g/10 min, even more preferably less than about 35 g/10 min, and even more preferably less than 20 g/10 min as measured in accordance with ASTM D-0138 (190° C./2.16 kg). At a minimum, the MI of the interpolymers is about 0.01 g/10 min, preferably about 0.05 g/10 min, and even more preferably about 0.08 g/10 min.

In an embodiment, the ethylene/α-olefin interpolymer suitable for use in the present invention have a molecular weight distribution (MWD) from about 0.5 to about 30, and preferably from about 2 to 2.5.

In an embodiment, the ethylene/α-olefin interpolymer suitable for use in the present invention have a Mooney viscosity range less than or equal to 20.

In one embodiment, the ethylene/α-olefin interpolymer comprises EPDM. In a preferred embodiment, the EPDM has an ethylene content of less than or equal to 60%, more preferably less than or equal to 50%. In a preferred embodiment, the EPDM has a low diene content.

In an embodiment, the ethylene/α-olefin interpolymer may comprise a blend of ethylene/α-olefin interpolymers.

An ethylene/α-olefin may comprise two or more embodiments as described herein.

Metal-Containing Filler

The fillers used in the practice of this invention typically comprise basic metal compounds. Exemplary fillers include, but are not limited to, metal oxides or hydroxides, such as titanium dioxide, magnesium oxide, zinc oxide, oxides of silicon, aluminum, sodium and potassium, and silicon dioxide; aluminum silicate; metal salts, such as calcium carbonate, and other metal-containing compounds. These fillers may be used independently or in combination with one or more of each other.

In an embodiment, the metal-containing filler is preferably an oxide or hydroxide of an alkali metal (e.g., Li, Na), an alkaline earth metal (e.g., Mg) or Zn.

The particle size of the metal-containing filler is not particularly limiting, although preferably the metal-containing filler is on the micro- or nano-scale.

In one embodiment, the filler comprises magnesium oxide (MgO), zinc oxide (ZnO), magnesium hydroxide (Mg(OH)$_2$), calcium carbonate (CaCO$_3$), sodium carbonate (Na$_2$CO$_3$) or combinations thereof. Preferably, the filler comprises MgO. The metal-containing filler may comprise two or more embodiments as described herein.

α,β-Unsaturated Carboxylic Acid

The α,β-unsaturated carboxylic acids used in the practice of this invention comprise at least one α,β-unsaturated carboxylic acid. Such α,β-unsaturated carboxylic acids include, for example, C$_3$ to C$_{20}$ α,β-unsaturated (ethylenically unsaturated) carboxylic acids, preferably methyl acrylic acid and acrylic acid. In a preferred embodiment, the α,β-unsaturated carboxylic acids useful in the present invention have a C$_3$ to C$_{10}$ carbon chain.

In an embodiment, the α,β-unsaturated carboxylic acid is selected from the group consisting of MAA, acrylic acid and combinations thereof.

The α,β-unsaturated carboxylic acid is desirably methyl acrylic acid (MAA).

An α,β-unsaturated carboxylic acid may comprise two or more embodiments as described herein.

Curing Agent

Any peroxide that will promote the crosslinking of the composition of this invention can be used in the practice of this invention. Exemplary peroxides include dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexane-3; 1,1-bis(t-butylperoxy)3,3,5-trimethylcyclo-hexane; isopropylcumyl cumylperoxide; di(isopropylcumyl) peroxide; or mixtures thereof. Preferably the peroxide curing agent is an organic peroxide.

In some embodiments, as an alternative, or in addition, to the use of peroxides for the crosslinking of the compositions of this invention, other approaches for crosslinking of polymers may be used to effect the desired degree of crosslinking. Such approaches and technologies are well known to those skilled in the art and include (but are not limited to) radiation crosslinking, moisture crosslinking, bisulfonyl azide crosslinking, etc. In some cases, it would be necessary for the ethylene and/or propylene polymers used in the practice of this invention to be functionalized appropriately to enable crosslinking (for example, with alkoxy silanes in the case of moisture crosslinking).

A curing agent may comprise two or more embodiments as described herein.

Additives and Fillers

The compositions of this invention can optionally include one or more additives and/or fillers. Nonlimiting examples of suitable additives include plasticizers and specifically liquid plasticizers (such as paraffin oil), cure boosters and scorch retardants, processing aids, coupling agents, acid scavengers, thermal stabilizers, light stabilizers (e.g., UV light stabilizers and absorbers), optical brighteners, antistatic agents, lubricants, antioxidants, catalysts, rheology modifiers, biocides, corrosion inhibitors, dehydrators, organic solvents, colorants (e.g., pigments and dyes), surfactants antiblocking agents, waxes, tackifiers, nucleating agents in addition to the block composite nucleators described above, flame retardants, and combinations thereof. Nonlimiting examples of fillers include fumed silica, precipitated silica, talc, calcium carbonates, carbon black, aluminosilicates, clay, zeolites, ceramics, mica, titanium dioxide, and combinations thereof. The type and amount of additives and/or filler is selected to maximize the manufacture, storage, use and/or economics of the composition.

Scorch inhibitors include 2,2,6,6-tetramethylpiperidinoxyl (TEMPO) and 4-hydroxy-2,2,6,6-tetramethylpiperidinoxyl (4-hydroxy TEMPO). Suitable UV light stabilizers include hindered amine light stabilizers (HALS) and UV light absorber (UVA) additives. Representative UVA additives include benzotriazole types such as Tinuvin 326 and Tinuvin 328 commercially available from Ciba, Inc. Blends of HALS and UVA additives are also effective. Examples of antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)methylcarboxy-ethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-dimethylbenzyl)diphenylamine, diphenyl-p-phenylenediamine, mixed di-aryl-p-phenylenediamines, and other hindered amine anti-degradants or stabilizers. Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; and nonionic surfactants.

Cold Shrink Composition

In an embodiment, the CS composition comprises
(A) a silicone rubber;
(B) an ethylene/α-olefin interpolymer;
(C) a filler; and
(D) an α,β-unsaturated carboxylic acid.

The silicone rubber, ethylene/α-olefin interpolymer, filler and α,β-unsaturated carboxylic acid may be any silicone rubber, ethylene/α-olefin interpolymer, filler and α,β-unsaturated carboxylic acid or combination thereof as described herein.

In an embodiment, the silicone rubber is a vinyl-terminated silicone rubber.

In an embodiment, the CS composition comprises 60-99 parts by weight, or preferably 60-80 parts by weight, silicone rubber per hundred parts resin (i.e., combined weight of silicone rubber and ethylene/α-olefin interpolymer) (phr).

In an embodiment, the ethylene/α-olefin interpolymer is selected from the group consisting of EPDM, EVA and combinations thereof.

In an embodiment, the ethylene/α-olefin interpolymer comprises EPDM. Preferably, the ethylene/α-olefin interpolymer is EPDM.

In an embodiment, the ethylene/α-olefin interpolymer consists of EPDM.

In an embodiment, the CS composition comprises 1-40 phr (based on the combined weight of silicone rubber and ethylene/α-olefin interpolymer), or preferably 20-40 phr, of ethylene/α-olefin interpolymer.

In an embodiment, the filler is selected from the group consisting of MgO, ZnO, Mg(OH)$_2$, CaCO$_3$, Na$_2$CO$_3$ and combinations thereof. Preferably, the filler comprises MgO.

In an embodiment, the filler consists of MgO.

In an embodiment, the CS composition comprises 1-50 phr, or preferably 10-30 phr, filler.

In an embodiment, the α,β-unsaturated carboxylic acid is selected from the group consisting of MAA, acrylic acid, and combinations thereof.

In an embodiment, the α,β-unsaturated carboxylic acid comprises MAA. Preferably, the α,β-unsaturated carboxylic acid is MAA.

In an embodiment, the α,β-unsaturated carboxylic acid consists of MAA.

In an embodiment, the CS composition comprises 1-10 phr, or preferably 0.5-3 phr, α,β-unsaturated carboxylic acid.

In an embodiment, the CS composition comprises
(A) 60-99 phr of an silicone rubber;
(B) 1-40 phr of an ethylene/α-olefin interpolymer;
(C) 1-50 phr of a filler; and
(D) 1-10 phr of a α,β-unsaturated carboxylic acid.

In a preferred embodiment, the CS composition comprises 60-99 phr of vinyl-terminated silicone rubber; 1-40 phr EPDM; 1-50 phr MgO and 1-10 phr MAA.

In an embodiment, the CS composition may also include an additive or mixture of additives as described herein. In a preferred embodiment, the CS composition comprises a plasticizer additive. In an embodiment, the plasticizer additive is paraffin oil In an embodiment, the CS composition comprises 1-10 phr, or preferably 1-5 phr plasticizer. In a preferred embodiment, the CS composition comprises 1-10 phr, or preferably 1-5 phr paraffin oil.

In an embodiment, the CS composition may also include a peroxide curing agent as described herein. Preferably the peroxide curing agent is an organic peroxide. The peroxide curing agent may be one peroxide curing agent or a mixture of two or more peroxide curing agents as described herein.

In an embodiment, the CS composition comprises 0.1-5 phr, or preferably 0.5-3 phr peroxide curing agent.

In an embodiment, the CS composition optionally includes an additional additive, such as an antioxidant, processing aid and/or flame retardant, as described herein. In an embodiment, the CS composition comprises at least one, preferably two and more preferably all three of an antioxidant, a processing aid and a flame retardant. In a preferred embodiment, the CS composition comprises 0-10 phr antioxidant, 0-10 phr processing aid, and/or 0-50 phr flame retardant. In an embodiment, the CS composition preferably comprises 0-2 phr antioxidant. In an embodiment, the CS composition preferably comprises 0-3 phr processing additive.

In one embodiment, the invention is a composition comprising
(A) 60-99 phr silicone rubber,
(B) 1-40 phr ethylene/α-olefin interpolymer;
(C) 1-50 phr filler;
(D) 1-10 phr α,β-unsaturated carboxylic acid;
(E) 1-10 phr plasticizer;
(F) 0.1-5 phr peroxide curing agent;
(G) 0-10 phr antioxidant;
(H) 0-10 phr processing aid; and
(I) 0-50 phr flame retardant.

Preferably, the invention is a CS composition comprising:
(A) 60-99 phr vinyl-terminated silicone rubber;
(B) 1-40 phr EPDM;
(C) 1-50 phr MgO;
(D) 1-10 phr MAA;
(E) 1-10 phr plasticizer;
(F) 0.1-5 phr peroxide curing agent;
(G) 0-10 phr antioxidant;
(H) 0-10 phr processing aid; and
(I) 0-50 phr flame retardant.

Surprisingly, the cold shrink composition shows improved tear resistance and ACBD strength while maintaining the tensile set performance observed with traditional CS products.

Not to be bound by any particular theory, it is thought that MAA grafts to both the silicone rubber and ethylene/α-olefin interpolymer molecular chains in the presence of the peroxide which acts as an initiator. At the same time, the MAA grafted to the silicone rubber and ethylene/α-olefin interpolymer also reacts with the metal oxide or hydroxide, resulting in in-situ bridges between the silicone rubber and ethylene/α-olefin interpolymer by forming ionomers. As a result, the interfacial interactions between the silicone rubber and ethylene/α-olefin interpolymer are enhanced, which contributes to improved tensile performance of the silicone rubber and ethylene/α-olefin blend.

In an embodiment, compositions of this invention have a dissipation factor at 30° C., Df(30), of less than 0.4%, or preferably less than 0.3%, or more preferably less than 0.2%, or even more preferably less than 0.1%.

In an embodiment, compositions of this invention have a dissipation factor at 90° C., Df(90) of less than 1%, or preferably less than 0.8%, or more preferably less than 0.6%, or even more preferably less than or equal to 0.4%, or even more preferably less than or equal to 0.2%.

In an embodiment, compositions of this invention have an ACBD strength of greater than 20 kV/mm, or more preferably greater than 25 kV/mm, or even more preferably greater than 30 kV/mm.

In an embodiment, compositions of this invention have a tear resistance of greater than or equal to 40 N/mm, or preferably greater than or equal to 44 N/mm, or more preferably greater than or equal to 50 N/mm.

In an embodiment, compositions of this invention have a tensile strength of greater than or equal to 6.0 MPa, or preferably greater than or equal to 6.5 MPa, or more preferably greater than or equal to 7.0 MPa, or even more preferably greater than or equal to 7.5 MPa, or even more preferably greater than or equal to 8.0 MPa.

In an embodiment, compositions of this invention have an elongation at break of greater than 300%, or preferably greater than 400%, or more preferably greater than 500%, or even more preferably greater than 600%.

In an embodiment, compositions of this invention have a tensile set of less than 20%, or preferably less than 19%, or more preferably less than or equal to 18.5%, or even more preferably less than or equal to 18.0%.

In an embodiment, compositions of this invention have a 100% tensile set modulus of from 0.5 to 5, or preferably from 0.5 to 2.5.

In an embodiment, compositions of this invention have a Shore A hardness of from 30 to 70, or preferably from 35 to 55.

In an embodiment, the compositions of this invention preferably have at least one, or at least two, or all three of (a) tensile set of less than 20%, (b) an ACBD strength of greater than 20 kV/mm, and (c) a tear resistance of greater than 40 N/mm. Preferably, the compositions of this invention have at least one, at least two, or all three of (a) tensile set of less than or equal to 18.5%, or more preferably less than or equal to 18%, (b) an ACBD strength of greater than 25 KV/mm, or more preferably greater than 30 KV/mm, and (c) a tear resistance of greater than 50 N/mm.

The CS composition may comprise two or more embodiments as described herein.

Compounding

The compositions of this invention are melt blended and used in the same manner as known compositions. Melt blending of the composition can be effected by standard means known to those skilled in the art. Examples of melt blending equipment are internal batch mixers, such as a BANBURY™, BOLLING™, or HAAKE™ internal mixer. Alternatively, continuous single or twin screw mixers can be used, such as a FARREL™ continuous mixer, a COPERION™ twin screw mixer, or a BUSS™ kneading continuous extruder. The components are mixed at a temperature and for a length of time sufficient to fully homogenize the mixture. The type of mixer utilized, and the operating conditions of the mixer, will affect properties of the composition such as viscosity, volume resistivity, and extruded surface smoothness.

In one embodiment, (A) silicone rubber, (B) ethylene/α-olefin interpolymer, (C) metal-containing filler, and (D) α,β-unsaturated carboxylic acid, and any additives are mixed, typically in the described sequence, in appropriate compounding equipment to obtain a mixture taking care not to induce premature crosslinking. The mixture is then formed into the desired shape by extrusion or molding, and then cured (or at least partially cured). If a molded article, typically it is at least partially cured in the mold. The article is then removed from the mold (if molded), stretched (typically axially) to the desired size, and held in the stretched state by mechanical means (such as a support core) until ready for use. In one embodiment, the article continues to cure after completion of the extrusion or molding operation.

Articles

In an embodiment, the invention is a cold shrink splice, at least a portion of the splice made from a crosslinked composition comprising (A) silicone rubber, (B) ethylene/α-olefin interpolymer, (C) metal-containing filler, and (D) α,β-unsaturated carboxylic acid. In an embodiment, at least a portion of the cold shrink article is made from a CS composition as described herein. The CS composition forming at least part of the cold shrink article may comprise two or more embodiments as described herein.

In an embodiment, the cold shrink article is in the form of a flexible tube, or splice. In an embodiment, the flexible tube of the present invention is held in radial expanded condition on a support core designed for removal from inside the flexible tube. The support core and flexible tube are coaxially superimposed upon each other, with the supporting core inside the flexible tube.

As used herein, "expanded condition" and similar terms, when used in reference to a CS composition and/or CS article, mean that the composition or article is stretched to 100-600% of its original size. In a preferred embodiment, a CS composition or CS article according to the present invention, is expanded to 200-300% of its original size when in expanded condition.

In an embodiment, a CS article of the present invention, preferably in the form of a flexible tube, is manufactured using processes and equipment known in the art. When the CS article is a flexible tube held in expanded condition on a support core, the support core may be made of polypropylene-, polyvinyl chloride, or Nylon-based materials. In some embodiments, the support core may be of a spiral or straight design, so long as the core is easily removed from the flexible tube during installation.

In an embodiment, the CS articles of the present invention have a dissipation factor at 30° C., Df(30), of less than 0.4%, or preferably less than 0.3%, or more preferably less than 0.2%, or even more preferably less than 0.1%.

In an embodiment, the CS articles of the present invention have a dissipation factor at 90° C., Df(90) of less than 1%, or preferably less than 0.8%, or more preferably less than 0.6%, or even more preferably less than or equal to 0.4%, or even more preferably less than or equal to 0.2%.

In an embodiment, the CS articles of the present invention have an ACBD strength of greater than 20 kV/mm, or more preferably greater than 25 kV/mm, or even more preferably greater than 30 kV/mm.

In an embodiment, the CS articles of the present invention have a tear resistance of greater than or equal to 40 N/mm, or preferably greater than or equal to 44 N/mm, or more preferably greater than or equal to 50 N/mm.

In an embodiment, the CS articles of the present invention have a tensile strength of greater than or equal to 6.0 MPa, or preferably greater than or equal to 6.5 MPa, or more preferably greater than or equal to 7.0 MPa, or even more preferably greater than or equal to 7.5 MPa, or even more preferably greater than or equal to 8.0 MPa.

In an embodiment, the CS articles of the present invention have an elongation at break of greater than 300%, or preferably greater than 400%, or more preferably greater than 500%, or even more preferably greater than 600%.

In an embodiment, the CS articles of the present invention have a tensile set of less than 20%, or preferably less than 19%, or more preferably less than or equal to 18.5%, or even more preferably less than or equal to 18.0%.

In an embodiment, the CS articles of the present invention have a 100% tensile set modulus of from 0.5 to 5, or preferably from 0.5 to 2.5.

In an embodiment, the CS articles of the present invention have a Shore A hardness of from 30 to 70, or preferably from 35 to 55.

In an embodiment, the CS articles of this invention preferably have at least one, or at least two, or all three of (a) tensile set of less than 20%, (b) an ACBD strength of greater than 20 kV/mm, and (c) a tear resistance of greater than 40 N/mm. Preferably, the CS articles of this invention have at least one, at least two, or all three of (a) tensile set of less than or equal to 18.5%, or more preferably less than or equal to 18%, (b) an ACBD strength of greater than 25 KV/mm, or more preferably greater than 30 KV/mm, and (c) a tear resistance of greater than 50 N/mm.

In an embodiment, the CS articles of the present invention are designed to work at typical cable operating temperatures. For example, for medium voltage cables, the conductor temperature is about 90° C. under continuous normal operation, but can approach 130° C. for short periods of time during emergency conditions.

Method of Making a Cold Shrink Article

In an embodiment, the present invention is a method of making a cold shrink article comprising:
(1) forming a composition comprising (A) silicone rubber, (B) ethylene/α-olefin interpolymer, (C) metal-containing filler, (D) α,β-unsaturated carboxylic acid, and additives (if any);
(2) forming the composition into a shaped article;

(3) at least partially curing the shaped article;
(4) stretching the cured, shaped article; and
(4) holding the stretched, cured and shaped article in expanded condition by mechanical means.

In one embodiment, the article is a flexible tube. In a further embodiment, the flexible tube is a cold shrink splice.

In an embodiment, the step of (1) forming the composition comprises melt blending the (A) ethylene/α-olefin interpolymer, (B) metal-containing filler, and (C) α,β-unsaturated carboxylic acid.

In an embodiment, the step of (2) forming the composition into a shaped article comprises injection molding the composition into the shaped article.

In an embodiment, the step of (4) holding the stretched, cured and shaped article in expanded condition by mechanical means comprises inserting a support core into an opening in the shaped article.

In an embodiment, the invention is a cold shrink article made from a composition comprising
(A) a silicone rubber;
(B) an ethylene/α-olefin interpolymer;
(C) a filler; and
(D) a α,β-unsaturated carboxylic acid.

In one embodiment, the invention is a cold shrink article comprising a shaped, stretched and cured CS composition comprising (A) a silicone rubber; (B) an ethylene/α-olefin interpolymer; (C) a filler; and (D) a α,β-unsaturated carboxylic acid.

In an embodiment, the invention is a cable having an external layer and comprising a cold shrink splice, the splice shrunk about and in contact with the external layer of the cable and comprising a shaped, cured, and shrunk CS composition, the composition comprising (A) a silicone rubber; (B) an ethylene/α-olefin interpolymer; (C) a filler; and (D) a α,β-unsaturated carboxylic acid. Exemplary cables include, but are not limited to, cables comprising an outer layer of crosslinked polyethylene and flexible cables, such as cables having an outer layer of rubber, for example those used in mining or industrial applications.

The CS composition may comprise any embodiment, or two or more embodiments, as described herein.

Method of Splicing a Cable

In an embodiment, the invention is a method of splicing a cable comprising:
(1) providing a cold shrink article, wherein at least a portion of the article comprises a CS composition comprising (A) silicone rubber, (B) ethylene/α-olefin interpolymer, (C) metal-containing filler, and (D) α,β-unsaturated carboxylic acid, and wherein the cold shrink article is in the form of a flexible tube held in radial expanded condition by a support core disposed inside the flexible tube;
(2) inserting at least a portion of a cable inside the support core;
(3) removing the support core from the cold shrink article; and
(4) allowing the cold shrink article to contract onto the at least a portion of the cable.

In an embodiment, the cold shrink article has an internal diameter which is less than the external diameter of the cable. In that way, when the CS article contracts, a good seal around the portion of the cable will be obtained.

In an embodiment, the at least a portion of the cable comprises a joint between two or more cables.

EXAMPLES

Test Methods

Tensile Test: Tensile properties (i.e., tensile strength, tensile elongation and tensile set modulus) are measured in accordance with ASTM D638 Type 4. Tensile tests are conducted on an INSTRON 5565 tensile tester at the speed of 500 mm/min according to ASTM D638. The tensile strength is reported in megaPascals (MPa).

Tensile Permanent Set Measurement: Tensile permanent set (or tensile set) is measured by a procedure in which reported one to three unstretched and conditioned specimens are placed in the clamps of the tension set apparatus. Place the specimen(s) in the grips of the testing machine, using care to adjust the specimen symmetrically to distribute tension uniformly over the cross section. The Tension Set apparatus is set to 100% elongation and verified using a caliper. The specimens are placed in the oven at a temperature of 100° C. for 22 hours and removed to room temperature (23° C.) for 10 minutes. The samples are then removed from the Tension Set apparatus. After 10 minutes, the distance between the marked gauges is measured. Tensile set is calculated according to the following equation $$S=100(D-G)/G$$

wherein S is the tension set in percent, D is the distance between the gauge marks (post set), and G is the original distance between gauge marks, or 1.0 inch (25.4 mm).

Di-Electric Strength and Dissipation Factor Measurement: The alternating current breakdown strength (ACBD) is measured on the Hipotronics (model 775-5-D149-P-B) at room temperature with a voltage increasing speed of 1 kilovolt per second (1 kV/s). ACBD is reported in kilovolts per millimeter (kV/mm). Dissipation factors at different temperatures were measured on the Q30 series instrument with the frequency of 50 HZ and the voltage of 1 kV. Before the test, sample sheets are pre-treated in a 60° C. oven for 5 days under 0.07-0.09 MPa vacuum.

Shore Hardness: Shore A hardness is measured on an Instron durometer (Model 902B) according to ASTM D2240 using sample sheets with a thickness of about 6 mm. Data was recorded with a ten second latency.

Tear Resistance: Tear resistance is measured in accordance with ASTM D624 Type B and reported in KN/m. Tear tests are conducted on an INSTRON 5565 tester at a speed of 500 mm/min.

Materials

Table 1 shows the materials used for the inventive and comparative examples.

TABLE 1

Raw Materials

| | Material | Supplier | Properties |
|---|---|---|---|
| Silicone Rubber | GP-30 Silicone | Dow Corning | Shore A 30, vinyl-terminated |
| Ethylene/α-olefin interpolymer | EPDM 4520 | The Dow Chemical Company | 50% ethylene; 3-5% diene; MV: 20 |
| Filler | MgO | Sinopharm Chemical Reagent Co. Ltd. | Purity: >98.5% |

TABLE 1-continued

| | Raw Materials | | |
|---|---|---|---|
| | Material | Supplier | Properties |
| α,β-unsaturated carboxylic acid | MAA | Aldrich | Purity: >99% |
| Plasticizer | SunPar 1300 | SunPar | Paraffin Oil |
| Peroxide Curing Agent | 2,5-dimethyl-2,5-di(tert-butylperoxy)hexane (L-101) | Aldrich | Purity ~92% |
| Antioxidant | Tinuvin 770 | BASF | |
| Antioxidant | 2-mercaptobenzimidazole (MB) | Aldrich | Purity ~98% |

Table 2 shows the formulations for the inventive and comparative examples.

TABLE 2

Formulations of Inventive and Comparative Examples

| | CE1 | CE2 | CE3 | CE4 | IE1 | IE2 | IE3 |
|---|---|---|---|---|---|---|---|
| Silicone Rubber | 100 | 70 | 70 | 70 | 70 | 70 | 70 |
| EPDM | — | 30 | 30 | 30 | 30 | 30 | 30 |
| Peroxide | 1 | 1 | 1 | 1 | 1 | 1 | 1 |
| MgO | — | — | — | 18 | 18 | 18 | 18 |
| MAA | — | — | 1.5 | — | 1.5 | 1.5 | 0.75 |
| Paraffin Oil | — | — | 2.4 | 2.4 | 2.4 | — | 2.4 |
| Stearic Acid | — | — | 0.3 | 0.3 | 0.3 | 0.3 | 0.3 |
| Polyethylene wax | — | — | 0.9 | 0.9 | 0.9 | 0.9 | 0.9 |
| Tinuvin 770 | — | — | 0.2 | 0.2 | 0.2 | 0.2 | 0.2 |
| MB | — | — | 0.2 | 0.2 | 0.2 | 0.2 | 0.2 |

The ethylene-α-olefin interpolymer, metal oxides, liquid plasticizers and α,β-unsaturated carboxylic acid are first premixed in a HAAKE™ mixer for 10 minutes at 50° C. with a rotor speed of 60 rpm. The compounds are then mixed with the silicone rubber for another 5 minutes, followed by the addition of the peroxide for another 2 minutes.

After mixing, the compositions are transferred to a two-roll mill at room temperature for 10 minutes to achieve uniform dispersion and prepare a compound sheet with a thickness of 1-2 mm for compression molding.

The sheets are further vulcanized in a hot compression machine at 175° C. for about 10 minutes.

Results

Table 3 shows the performance of both inventive and comparative examples.

TABLE 3

Properties of Inventive and Comparative Formulations

| | CE1 | CE2 | CE3 | CE4 | IE1 | IE2 | IE3 |
|---|---|---|---|---|---|---|---|
| Df(30° C.), % | 0.045 | 0.067 | 0.121 | 0.134 | 0.056 | 0.069 | 0.069 |
| Df(90° C.), % | 0.369 | 0.245 | 0.5 | 0.753 | 0.254 | 0.144 | 0.106 |
| ACBD strength, KV/mm | 22.6 | 19.6 | 21.1 | 24.5 | 26.6 | 29.1 | 33.4 |
| Tear resistance, KN/m | 31.30 | 22.11 | 28.8 | 43.5 | 51.4 | 50.8 | 47.2 |
| Tensile Strength, MPa | 4.50 | 4.44 | 6.15 | 7.57 | 8.01 | 6.03 | 7.1 |
| Elongation at Break, % | 504 | 447 | 911 | 747 | 661 | 534 | 723 |
| Tensile Set, % | <5 | <5 | 65.5 | 16.5 | 15 | 14.6 | 15.8 |
| 100% modulus, MPa | 0.63 | 0.76 | 0.43 | 0.82 | 1 | 1.12 | 0.93 |
| Shore A | 29.0 | 33.6 | 22.4 | 35.5 | 36.8 | 43.9 | 36.0 |

As illustrated in Table 3, CE1 (neat silicone rubber) has poor tensile strength, tear resistance (31.3 KN/m) and ACBD strength (22.6 KV/mm), although it has good tensile recovery (tensile set) performance. CE2 is a silicone rubber/EPDM (70/30) blend, which did not show any improvement on the tensile strength, tear resistance and ACBD strength.

IE1 is a silicone rubber/EPDM blend with the same blending ratio as CE2 but compatibilized by MgO, MAA and other optional ingredients. IE1 has much better tensile strength and elongation, tear resistance and ACBD strength in comparison with CE1 and CE2. The tensile recovery (tensile set) performance of IE1 is not as good as CE1 and CE2, but still meets the requirement of less than 20%.

Based on the results observed with CE3 and CE4, the metal filler (e.g., MgO) and α,β-unsaturated carboxylic acid (e.g., MAA) are critical components and must be simultaneously used. The performance of silicone rubber/EPDM blends decreases if the metal filler and α,β-unsaturated carboxylic acid are used singly.

IE2 (similar to IE1, but without paraffin oil), also shows excellent performance in comparison with CE1 and CE2, indicating that plasticizer (e.g., paraffin oil) is an optional component.

IE3 and IE4 also show the effect of different metal filler (MgO) and α,β-unsaturated carboxylic acid (MAA) levels. Both examples show improved performance (i.e., better tear, tensile and ACBD strength) compared to CE1 and CE2.

In summary, the current inventive cold shrink compositions provide improved tensile, tear and ACBD strengths compared with neat silicone rubber and uncompatibilized silicone rubber/EPDM blends. The tensile recovery performance of the inventive compositions, although lower than the neat silicone rubber and silicone rubber/EPDM blend compositions, still meets the industry standard of less than 20%. In addition to the excellent performance, the inventive CS compositions afford a much lower raw material cost in comparison with the current silicone rubber based technology.

The invention claimed is:

1. A composition comprising:
   a resin blend comprising
   (A) 60-80 parts of a silicone rubber per 100 parts of the resin blend (phr), and
   (B) 20-40 phr of an ethylene/α-olefin interpolymer;
   (C) 10-30 phr of a filler; and
   (D) 0.5-3 phr of an α,β-unsaturated carboxylic acid.

2. A cold shrink article made from the composition of claim 1.

3. The cold shrink article of claim 2, the composition having an ACBD strength of greater than 20 kV/mm and a tear resistance of greater than or equal to 40 N/mm.

4. The cold shrink article of claim 2, the composition comprising:
   (A) 60-80 phr vinyl-terminated silicone rubber;
   (B) 20-40 phr EPDM;
   (C) 10-30 phr MgO;
   (D) 0.5-3 phr MAA;
   (E) 1-10 phr plasticizer;
   (F) 0.1-5 phr peroxide curing agent;
   (G) 0-10 phr antioxidant;
   (H) 0-10 phr processing aid; and
   (I) 0-50 phr flame retardant.

5. The cold shrink article of claim 2 having at least one of (a) tensile set of less than 20%, (b) an ACBD strength of greater than 25 kV/mm, and (c) a tear resistance of greater than 44 N/mm.

6. A cold shrink article comprising a shaped, stretched and cured composition comprising the composition of claim 1.

7. A cable having an external layer and comprising a cold shrink splice, the splice shrunk about and in contact with the external layer of the cable and comprising a shaped and cured crosslinked composition, the composition comprising the composition of claim 1.

8. A composition comprising:
   a resin blend comprising
   (A) 60-80 parts of a silicone rubber per 100 parts of the resin blend (phr), and
   (B) 20-40 phr of an ethylene/α-olefin interpolymer;
   (C) 10-30 phr of a filler; and
   (D) 0.5-3 phr of an α,β-unsaturated carboxylic acid; and
   having an ACBE strength of greater than 20 kV/mm and a tear resistance of greater than or equal to 40 N/mm.

9. The composition of claim 8 wherein the silicone rubber comprises a vinyl-terminated silicone rubber.

10. The composition of claim 8 wherein the ethylene/α-olefin interpolymer comprises EPDM.

11. The composition of claim 8 wherein the filler comprises a metal oxide or metal hydroxide.

12. The composition of claim 8 wherein the α,β-unsaturated carboxylic acid comprises methyl acrylic acid.

13. The composition of claim 8 having a Shore A hardness of from 30 to 70 and further comprising:
   (E) 1-10 phr plasticizer;
   (F) 0.1-5 phr peroxide curing agent;
   (G) 0-10 phr antioxidant;
   (H) 0-10 phr processing aid; and
   (I) 0-50 phr flame retardant.

14. The composition of claim 13 comprising:
   (A) 60-80 phr vinyl-terminated silicone rubber;
   (B) 20-40 phr EPDM;
   (C) 10-30 phr MgO;
   (D) 0.5-3 phr MAA;
   (E) 1-10 phr plasticizer;
   (F) 0.1-5 phr peroxide curing agent;
   (G) 0-10 phr antioxidant;
   (H) 0-10 phr processing aid; and
   (I) 0-50 phr flame retardant.

15. A method of splicing a cable comprising:
   (1) providing a cold shrink article comprising a flexible sleeve made from a composition comprising (A) a silicone rubber; (B) an ethylene/α-olefin interpolymer; (C) a filler; and (D) an α,β-unsaturated carboxylic acid, wherein the flexible sleeve is held in radially expanded condition on a support core;
   (2) inserting at least a portion of a cable inside the support core;
   (3) removing the support core from the cold shrink article; and
   (4) allowing the cold shrink article to contract onto the at least a portion of the cable.

* * * * *